United States Patent
Kim et al.

(10) Patent No.: US 8,139,307 B2
(45) Date of Patent: *Mar. 20, 2012

(54) HARD DISK DRIVE APPARATUS, METHOD OF CONTROLLING FLYING HEIGHT OF MAGNETIC HEAD THEREOF, AND RECORDING MEDIUM TO CONTAIN COMPUTER PROGRAM THEREFOR

(75) Inventors: Young-Shin Kim, Seoul (KR); Jong Lak Park, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 764 days.

This patent is subject to a terminal disclaimer.

(21) Appl. No.: 12/108,664

(22) Filed: Apr. 24, 2008

(65) Prior Publication Data

US 2008/0266703 A1 Oct. 30, 2008

(30) Foreign Application Priority Data

Apr. 27, 2007 (KR) ........................ 10-2007-0041364

(51) Int. Cl.
*G11B 21/02* (2006.01)
(52) U.S. Cl. ........................................................ 360/75
(58) Field of Classification Search .................. 360/59, 360/75, 69; 702/166; 713/324
See application file for complete search history.

(56) References Cited

U.S. PATENT DOCUMENTS

| | | | |
|---|---|---|---|
| 6,587,301 B1 | 7/2003 | Smith | |
| 7,301,719 B1 * | 11/2007 | Chen et al. | 360/69 |
| 7,426,090 B2 * | 9/2008 | Yamashita et al. | 360/75 |
| 7,468,854 B2 * | 12/2008 | Yamashita et al. | 360/75 |
| 7,542,227 B2 * | 6/2009 | Che et al. | 360/75 |
| 7,583,467 B2 * | 9/2009 | Lee | 360/75 |
| 7,620,519 B2 * | 11/2009 | Yoon | 702/166 |
| 2002/0024774 A1 | 2/2002 | Berger et al. | |
| 2003/0026019 A1 | 2/2003 | Smith | |
| 2006/0119974 A1 * | 6/2006 | Yamazaki et al. | 360/75 |
| 2008/0174902 A1 * | 7/2008 | Kim et al. | 360/75 |
| 2008/0198497 A1 * | 8/2008 | Lee et al. | 360/59 |
| 2008/0198499 A1 * | 8/2008 | Linggajaya et al. | 360/75 |
| 2008/0266704 A1 * | 10/2008 | Kim et al. | 360/75 |
| 2009/0013203 A1 * | 1/2009 | Chen et al. | 713/324 |

FOREIGN PATENT DOCUMENTS

| | | |
|---|---|---|
| EP | 1517307 | 3/2005 |
| JP | 2000-90615 | 3/2000 |

* cited by examiner

*Primary Examiner* — Fred Tzeng
(74) *Attorney, Agent, or Firm* — Stazione & Kim, LLP

(57) ABSTRACT

A method of controlling a flying height of a magnetic head of a hard disk drive includes determining whether a difference between a measured flying height of the magnetic head measured by applying a burn-in FOD (flying on demand) voltage corresponding to a target flying height, according to a reference FOD voltage profile defining a relationship between the flying height of the magnetic head and the FOD voltage by which an end of the magnetic head thermally expands and thus protrudes, to a heater included in the magnetic head, and a burn-in flying height of the reference FOD voltage profile corresponding to the burn-in FOD voltage exceeds a preset reference, calculating a corrected FOD voltage for the target flying height by performing a touch down test of the magnetic head with respect to a disk, when the difference between the measured flying height of the magnetic head and the burn-in flying height exceeds the preset reference, and controlling a flying height of the magnetic head by applying the corrected FOD voltage. An FOD voltage can be applied in a variety of environments to substantially maintain the target FH of the magnetic head.

23 Claims, 4 Drawing Sheets

HARD DISK DRIVE APPARATUS, METHOD OF CONTROLLING FLYING HEIGHT OF MAGNETIC HEAD THEREOF, AND RECORDING MEDIUM TO CONTAIN COMPUTER PROGRAM THEREFOR

CROSS-REFERENCE TO RELATED APPLICATIONS

This application claims the priority under 35 U.S.C. §119(a) of Korean Patent Application No. 10-2007-0041364, filed on 27 Apr. 2007, in the Korean Intellectual Property Office, the disclosure of which is incorporated herein by reference in its entirety.

BACKGROUND OF THE INVENTION

1. Field of the Invention

The present general inventive concept relates to a hard disk drive, a method of controlling a flying height of a magnetic head of the hard disk drive, and a recording medium to contain computer-readable codes as a computer program to execute the method, and more particularly, to a hard disk drive which can maintain a target flying height of a magnetic head in a variety of environments, a method of controlling the flying height of a magnetic head of the hard disk drive, and a recording medium to contain computer-readable codes as a computer program to execute the method.

2. Description of the Related Art

Hard disk drives (HDDs) formed of electronic parts and mechanical parts are one of memory devices for recording and reproducing data by converting digital electric pulses to a magnetic field. The HDD is widely used as one of auxiliary memory devices for a computer system because of its fast access time to a large amount of data.

With the recent increase in TPI (tracks per inch) and BPI (bits per inch), the HDD has a high storage capacity and its application field has expanded. Accordingly, there have been active developments about compact HDDs which can be used for portable electronic products such as notebook computers, personal digital assistants (PDAs), and mobile phones. A compact HDD having a diameter of 2.5 inches are developed and already applied to notebook computers. Also, a compact HDD having a diameter of 0.85 inches, which is smaller than the 2.5 inch HDD, has been recently developed and is already used, or expected to be used in mobile phones or MP3 players.

As the storage capacity of the HDD increases, the size of a read/write sensor of a magnetic head decreases and a flying height (FH) of the magnetic head flying above a recording surface of a disk gradually decreases. That is, when high TPI and BPI are embodied to manufacture an HDD with a high storage capacity, the width of a track decreases and accordingly the strength of a magnetic field decreases in proportional thereto. Thus, when the FH of a magnetic head increases, the detection of a magnetic head is difficult so that the operation of the HDD is not smooth.

In this regard, a study on a method for effectively reducing the FH of a magnetic head with respect to a disk is actively performed. One of the methods is to reduce distribution of the FH of a magnetic head and the other method is to effectively reduce the FH of a magnetic head to obtain the minimum FH of a magnetic head.

Also, a study on a method for effectively reducing the FH of a magnetic head with respect to a disk by appropriately controlling the FH of the magnetic head is widely performed, and one of the methods is flying on demand (FOD). The FOD is a method for controlling the FH of a magnetic head using a reduction characteristic of the FH of a magnetic head generated during thermal expansion of a pole tip that is an end portion of the magnetic head, during the operation of the HDD, by applying a constant voltage, that is, an FOD voltage, to a heater coil included in the magnetic head.

Recently, a reference FOD voltage (or an FOD current or FOD power) profile indicating a relationship between the FH of a magnetic head and an FOD voltage is calculated using an FOD apparatus in a burn-in process. The FOD voltage is selected to maintain a desired FH of a magnetic head in a user's environment based on the reference FOD voltage profile. In detail, in the burn-in process, when a gradually increasing FOD voltage is applied to the magnetic head through a touch down test, the magnetic head maintaining a flying state at a predetermined height is gradually lowered toward the disk and finally touched down on the disk. The reference FOD voltage profile indicating the relationship between the FOD voltage and the FH of the magnetic head is provided through the touch down test.

A target clearance, that is, an FOD voltage needed for a target FH, in an actual user environment is calculated from the reference FOD voltage profile, and related data is stored in a maintenance cylinder of a disk. Thus, the FOD voltage calculated in the burn-in process is applied to the heater included in the magnetic head in the user environment so that a target FH of the magnetic head is maintained.

However, the environment where the HDD is actually in use is quite various and different from a reference environment so as not to be the same as that of the burn-in process. Accordingly, when the FOD voltage needed for a target FH that is selected based on the reference FOD voltage profile provided in the burn-in process is applied to the user environment where the HDD is in use, the FH of the magnetic head may vary according to the environment where the HDD is used. In particular, since a temperature sensor is generally included in the HDD, even when the effect by a temperature is compensated for to a degree by measuring a change in the temperature using the temperature sensor, it is very difficult to reflect a change in the altitude or humidity that affects the FH of the magnetic head.

When the HDD is used in the user environment based on the FOD voltage measured in the burn-in process, the target FH of the magnetic head may not be maintained due to an effect of a combination of various environment variables. When the target FH of the magnetic head is not maintained, a problem of weak write or head disk interference can be generated so that the reliability of FOD is deteriorated.

Also, in the method for controlling the FH of the magnetic head using the FOD voltage calculated based on the reference FOD voltage profile provided in the burn-in process, since the FOD voltage is not an actual value based on the actual FH of the magnetic head in the actual user environment but an estimated value approximated to the actual value, the FHs of the magnetic head operating in a variety of environments cannot be accurately controlled.

SUMMARY OF THE INVENTION

The present general inventive concept provides a hard disk drive apparatus which can apply an FOD voltage to substantially maintain a target flying height (FH) of a magnetic head in a variety of environments and accordingly prevent a problem related to weak write of the magnetic head or head disk interference HDI, a method of controlling the FH of a magnetic head of the HDD, and a recording medium to contain computer-readable codes as a computer program to execute the method.

Additional and/or other aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of controlling a flying height of a magnetic head of a hard disk drive, the method including determining whether a difference between a measured flying height of the magnetic head measured by applying a burn-in FOD (flying on demand) voltage corresponding to a target flying height, according to a reference FOD voltage profile defining a relationship between the flying height of the magnetic head and the FOD voltage by which an end of the magnetic head thermally expands and thus protrudes, to a heater included in the magnetic head, and a burn-in flying height of the reference FOD voltage profile corresponding to the burn-in FOD voltage exceeds a preset reference, calculating a corrected FOD voltage for the target flying height by performing a touch down test of the magnetic head with respect to a disk, when the difference between the measured flying height of the magnetic head and the burn-in flying height exceeds the preset reference, and controlling a flying height of the magnetic head by applying the corrected FOD voltage.

The foregoing and/or other aspects and utilities of the present general inventive concept may also be achieved by providing a recording medium to contain computer-readable codes as a computer program to execute the method.

The determining of whether a difference between the measured flying height of the magnetic head and the burn-in flying height of the magnetic head exceeds the preset reference may include determining whether it is an idle time or a ready time, measuring the measured flying height of the magnetic head by applying the burn-in FOD voltage, calculating an absolute value of the difference between the measured flying height of the magnetic head and the burn-in flying height of the magnetic head, and determining whether the absolute value of the difference between the measured flying height of the magnetic head and the burn-in flying height of the magnetic head exceeds the preset reference value.

The determining of whether a difference between the measured flying height of the magnetic head and the burn-in flying height of the magnetic head exceeds the preset reference and the calculating of a corrected FOD voltage for the target flying height may be performed during the idle time or ready time of the hard disk drive.

The reference FOD Voltage profile may be provided in a burn-in process.

The foregoing and/or other aspects and utilities of the present general inventive concept may also be achieved by providing a hard disk drive apparatus including a magnetic head to record data on a disk or to reproduce the recorded data, and a controller to determine whether a difference between a measured flying height of the magnetic head measured by applying a burn-in FOD (flying on demand) voltage corresponding to a target flying height, according to a reference FOD voltage profile defining a relationship between the flying height of the magnetic head and the FOD voltage by which an end of the magnetic head thermally expands and thus protrudes, to a heater included in the magnetic head, and a burn-in flying height of the reference FOD voltage profile corresponding to the burn-in FOD voltage exceeds a preset reference, and to control the flying height of the magnetic head by applying a corrected FOD voltage for the target flying height that is calculated by performing a touch down test of the magnetic head with respect to the disk when the difference between the measured flying height of the magnetic head and the burn-in flying height of the magnetic head exceeds the preset reference.

When determining whether the difference between the measured flying height of the magnetic head and the burn-in flying height of the magnetic head exceeds the preset reference, in the idle time or ready time, the controller may determine whether an absolute value of the difference between the measured flying height of the magnetic head measured by applying the burn-in FOD voltage and the burn-in flying height of the magnetic head exceeds the preset reference.

The controller may calculate a corrected FOD voltage for the target flying height in the idle time or ready time of the hard disk drive.

The reference FOD voltage profile may be provided in a burn-in process.

The foregoing and/or other aspects and utilities of the present general inventive concept may also be achieved by providing a hard disk drive apparatus including a magnetic head unit having a head and a heater, and a controller to apply an FOD voltage of a FOD voltage profile to the heater, and to adjust the FOD voltage according to a measured flying height of the head with respect to the applied FOD voltage, a reference flying height of the FOD voltage profile, and a maximum flying height of a touch down test.

The controller may perform the touch down test to measure the maximum flying height when a difference between the measured flying height and the reference flying height is greater than a reference.

The FOD voltage may be a burn-in FOD voltage.

The FOD voltage profile may include a plurality of sub VOD voltage profiles having FOD voltages and reference flying voltages according to a plurality of environments.

The controller may obtain a corrected FOD voltage with respect to the reference flying height according to the adjusted FOD voltage.

The reference may include a plurality of sub references according to a plurality of environmental factors, and one of the plurality of the sub references is selected as the reference according to one of the plurality of environmental factors.

The controller may apply the adjusted FOD voltage to the magnetic head unit to maintain the reference flying height.

The foregoing and/or other aspects and utilities of the present general inventive concept may also be achieved by providing a method of controlling a flying height of a magnetic head of a hard disk drive apparatus, the method including a magnetic head unit having a head and a heater, and applying an FOD voltage of a FOD voltage profile to a heater of the magnetic head unit, and adjusting the FOD voltage according to a measured flying height of the head with respect to the applied FOD voltage, a reference flying height of the FOD voltage profile, and a maximum flying height of a touch down test.

The method may further include performing the touch down test to measure the maximum flying height when a difference between the measured flying height and the reference flying height is greater than a reference.

The FOD voltage may be a burn-in FOD voltage.

The FOD voltage profile may include a plurality of sub VOD voltage profiles having FOD voltages and reference flying voltages according to a plurality of environments.

The method may further include obtaining a corrected FOD voltage with respect to the reference flying height according to the adjusted FOD voltage.

The reference may include a plurality of sub references according to a plurality of environmental factors, and one of the plurality of the sub references is selected as the reference according to one of the plurality of environmental factors.

The adjusted FOD voltage may be applied to the magnetic head unit to maintain the reference flying height.

BRIEF DESCRIPTION OF THE DRAWINGS

The above and/or other aspects and advantages of the present general inventive concept will become apparent and more readily appreciated from the following detailed description, taken in conjunction with the accompanying drawings of which.

DETAILED DESCRIPTION OF THE PREFERRED EMBODIMENTS

Figure 1:
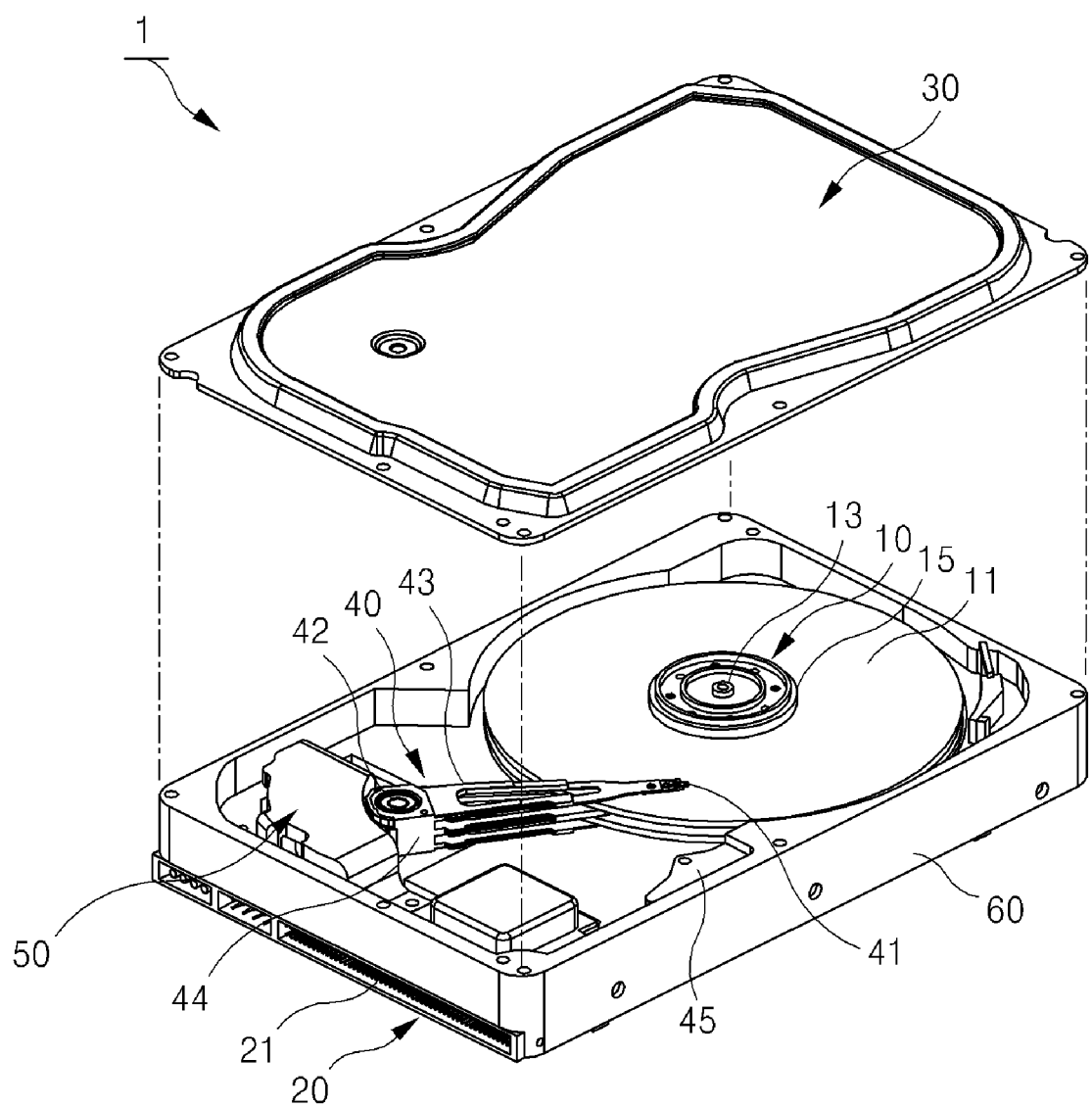
FIG. 1 is a partially exploded perspective view illustrating a hard disk drive apparatus according to an embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a partially exploded perspective view illustrating a hard disk drive apparatus HDD 1 according to an embodiment of the present general inventive concept. Referring to FIG. 1, the HDD 1 includes a disk pack 10 having at least one disk 11 on which data is recorded and from which data is reproduced, a printed circuit board assembly PCBA 20, a cover 30, a head stack assembly HSA 40 having a magnetic head 41 installed at a leading end portion to read data from the disk 11, a voice coil motor VCM 50 pivoting the HSA 40, and a base 60 supporting the above elements.

The disk pack 10 includes the disk 11, a shaft 13 forming a rotation center of the disk 11, a spindle motor hub (not shown) provided outside the shaft 13 in a radial direction and supporting the disk 11, a clamp 15 coupled to an upper portion of the spindle motor hub, and a clamp screw (not shown) pressing the clamp 15 to fixedly install the disk 11 on the spindle motor hub.

The PCBA 20 includes a printed circuit board PCB (not shown) having a plate shape and a PCB connector 21 provided at one side of the PCB. A plurality of chips and circuits to control the disk 11 and the magnetic head 41 are provided on the PCB. The PCB connector 21 is used to communicate with external devices.

The cover 30 covers the upper surface of the base 60, thereby forming an accommodation space for accommodating the disk pack 10 and the HSA 40. Thus, various elements in the accommodation space can be protected.

The VCM 50 is a sort of a drive motor to pivot an actuator arm 43 to move the magnetic head 41 to a desired position on the disk 11 using the Fleming's left hand rule, that is, a force is generated when a current is applied to a conductive body existing in a magnetic field. As a current is applied to a VCM coil (not shown) located between magnets (not shown), a force is applied to a bobbin (not shown) so that the bobbin is rotated. Accordingly, as the actuator arm 43 extending in a direction opposite to the bobbin from a pivot shaft holder 44 pivots so that the magnetic head 41 supported at a tip end of the actuator arm 43 is moved in a radial direction on the disk 11 that is rotated, searches for a track, accesses the searched track, and performs signal process of the accessed information.

The base 60 constitutes a frame, on which the above-described parts such as the disk pack 10, the HSA 40, and the PCBA 20 are assembled. Also, a ramp 45 where the magnetic head 41 is parked when power is discontinued is installed on the base 60.

The HSA 40 is a carrier for recording data on the disk 11 or reproducing the recorded data and includes the magnetic head (read/write head) 41 writing data to the disk 11 or reading recorded data, the actuator arm 43 pivoting on the disk 11 around a pivot shift 42 as a center to enable the magnetic head 41 to access the data on the disk 11, a suspension (not shown) coupled to the end portion of the actuator arm 43, the pivot shaft holder 44 rotatably supporting the pivot shaft 42, where the actuator arm 43 is coupled and supported, and the bobbin (not shown) provided in a direction opposite to the actuator arm 43 with respect to the pivot shaft holder 44 and located between the VCM 50 and the magnets (not shown).

The magnetic head 41 reads or records information with respect to the disk 11 that is rotated, by detecting a magnetic field formed on the surface of the disk 11 or magnetizing the surface of the disk 11. The magnetic head 41 includes a read head (not shown) to detect the magnetic field of the disk 11 or a write head (not shown) to magnetize the disk 11.

The magnetic head 41 flies above the disk 11 by airflow generated during the rotation of the disk 11 to perform recording and reproducing work with respect to the disk 11. The magnetic head 41 needs to maintain a predetermined FH, that is, a target FH or a target clearance with respect to the disk 11. Thus, as described above, in order to control the FH of the magnetic head 41 with respect to the disk 11 by applying the FOD voltage to the magnetic head 41 that records and reproduces information with respect to the disk 11 by being lifted above the disk 11 due to the air flow.

Figure 2:
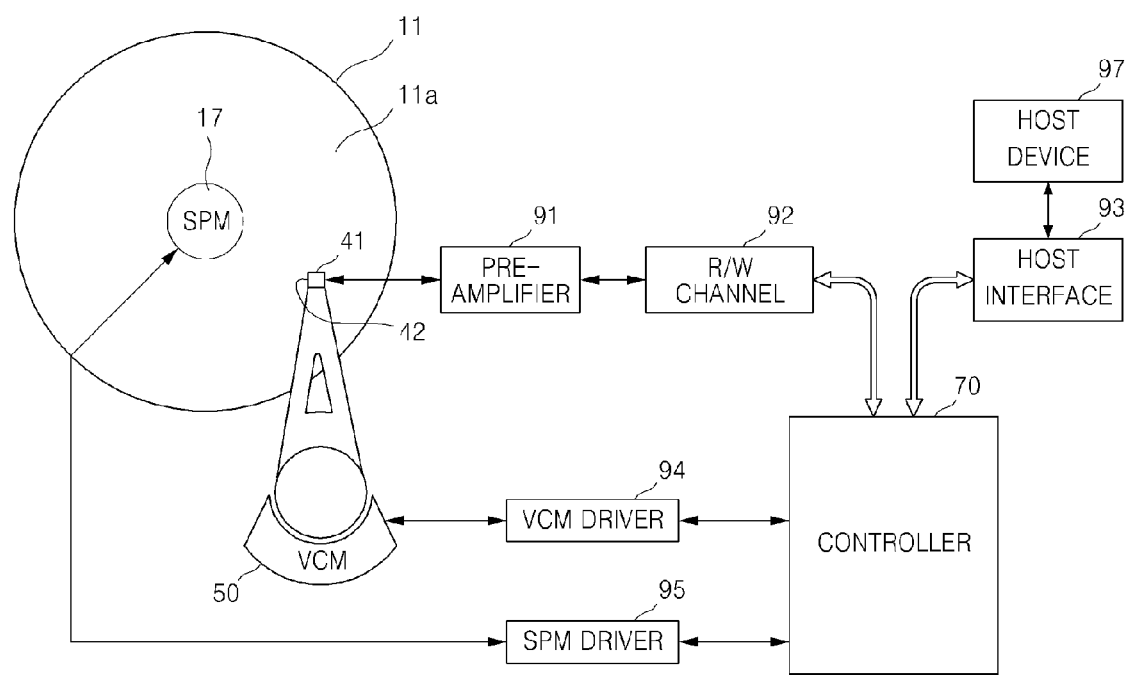
FIG. 2 is a block diagram illustrating a drive circuit of the hard disk drive apparatus of FIG. 1 to perform a method of controlling a flying height of a magnetic head.

FIG. 2 is a block diagram illustrating a drive circuit of the hard disk drive of FIG. 1 to perform a method of controlling a flying height (FH) of the magnetic head 41. Referring to FIG. 2, the HDD 1 is a drive circuit and includes a pre-amplifier (Pre-AMP) 91, a read/write (R/W) channel 92, a host interface 93, a voice coil driver 94, a spindle motor (SPM) driver 95, and a controller 70.

The Pre-AMP 91 amplifies a read signal generated by the read head that detects a magnetic field from the disk 11 and outputs the amplified read signal to the R/W channel 92, or amplifies a current of a particular waveform received from the R/W channel 92 and supplies the amplified current to the write head.

The R/W channel 92 converts the read signal amplified by the pre-amplifier 91 to a digital signal and outputs the converted read signal to the controller 70. Also, the R/W channel 92 receives the data that is received by the host interface 93 via the controller 70, converts the received data to an analog signal, and output the analog signal to the pre-amplifier 91.

The host interface 93 transmits the converted digital signal to a host device 97 in a data determination mode and receives the data input by a user from the host device 97 and outputs the received data to the controller 70 in a data recording mode. The term "host device" can be used to collectively refer to a component, like a CPU or I/O controller of a computer, controlling and operating a total computer system including the HDD.

The VCM driver 94 controls the amount of a current applied to the VCM 50 according to a control signal of the controller 70. The SPM driver 95 controls the amount of a current applied to a spindle motor 17 according to a control signal of the controller 70.

The controller 70 receives via the host interface 93 data input by a user through the host device and outputs the received data to the R/W channel 92 in a data recording mode, and receives a read signal converted to a digital signal by the R/W channel 92 and outputs the received signal to the host interface 93 in a data determination mode. Also, the controller 70 controls outputs of the VCM driver 94 and the spindle motor driver 95.

Figure 4:
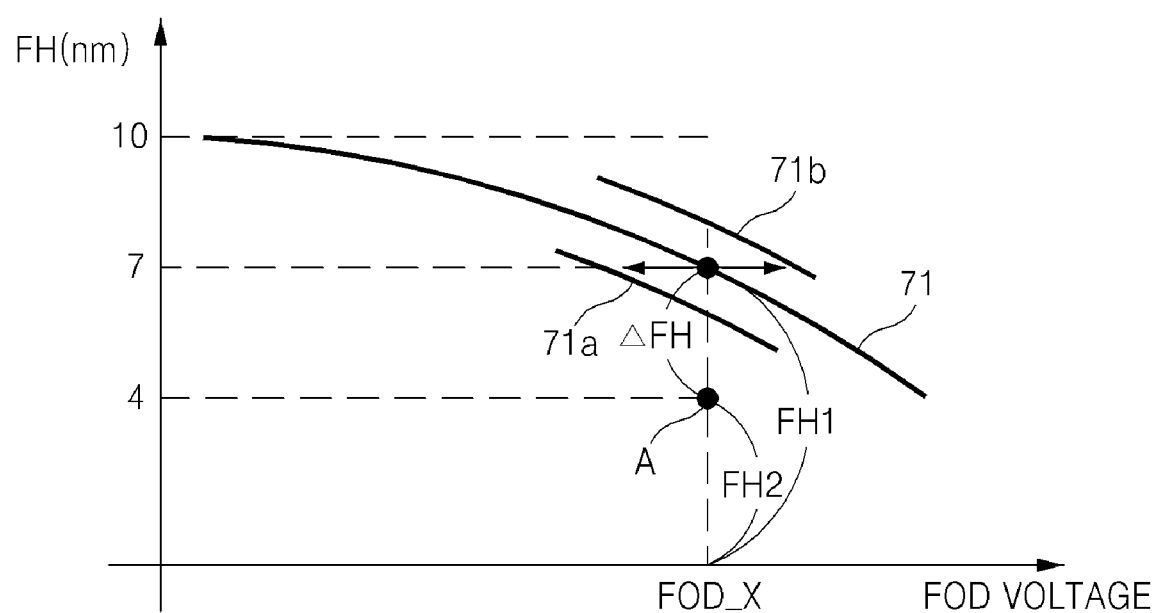
FIG. 4 is a graph illustrating the FOD voltage and the flying height of the magnetic head of the hard disk drive apparatus of FIG. 1.

The controller 70 can be a microprocessor or a microcontroller and implemented in form of software or firmware executing a method of controlling the FH of the magnetic head 41 of the HDD 1. FIG. 4 illustrates a reference FOD voltage profile 71. Here, the reference FOD voltage profile 71 may define a relationship between the FH of the magnetic head 41 and the FOD voltage to thermally expand an end of the magnetic head 41 to protrude with respect to the disk to form the FH.

Referring to FIGS. 2 and 4, the controller 70 determines whether a difference ΔFH between a measured FH FH2 of the measured magnetic head 41 measured by applying a burn-in FOD voltage FOD_X corresponding to a target FH according to a reference FOD voltage profile 71 to a heater 42 included in the magnetic head 41, and a burn-in FH1 according to the reference FOD voltage profile 71 corresponding to the burn-in FOD voltage FOD_X, exceeds a preset reference. When the difference ΔFH between the measured FH FH2 and the burn-in FH FH1 of the magnetic head 41 exceeds the preset reference, a touchdown test of the magnetic head 41 to the disk 11 is performed to calculate a corrected FOD voltage to correspond to a target FH so that the FH of the magnetic head 41 is controlled by applying the corrected FOD voltage. Thus, an FOD voltage that can substantially maintain the target FH of the magnetic head 41 in a variety of environments can be applied to the magnetic head 41 so that reliability in controlling the FOD can be improved. The heater 42 is disposed adjacent to the magnetic head 41 to generate heat to expand to adjust a height of the magnetic head 41 with respect to the disk due to an expansion characteristic of the heater 42. The magnetic head 41 and the heater 42 may be referred to as a magnetic head unit.

Here, a conventional measuring method can be used to perform the above-described measuring operation of the FH FH2 of the measured magnetic head 41 when the burn-in FOD voltage FOD_X corresponding to the target FH is applied to the heater 42 included in the magnetic head 41 according to the reference FOD voltage profile 71.

Figure 3:
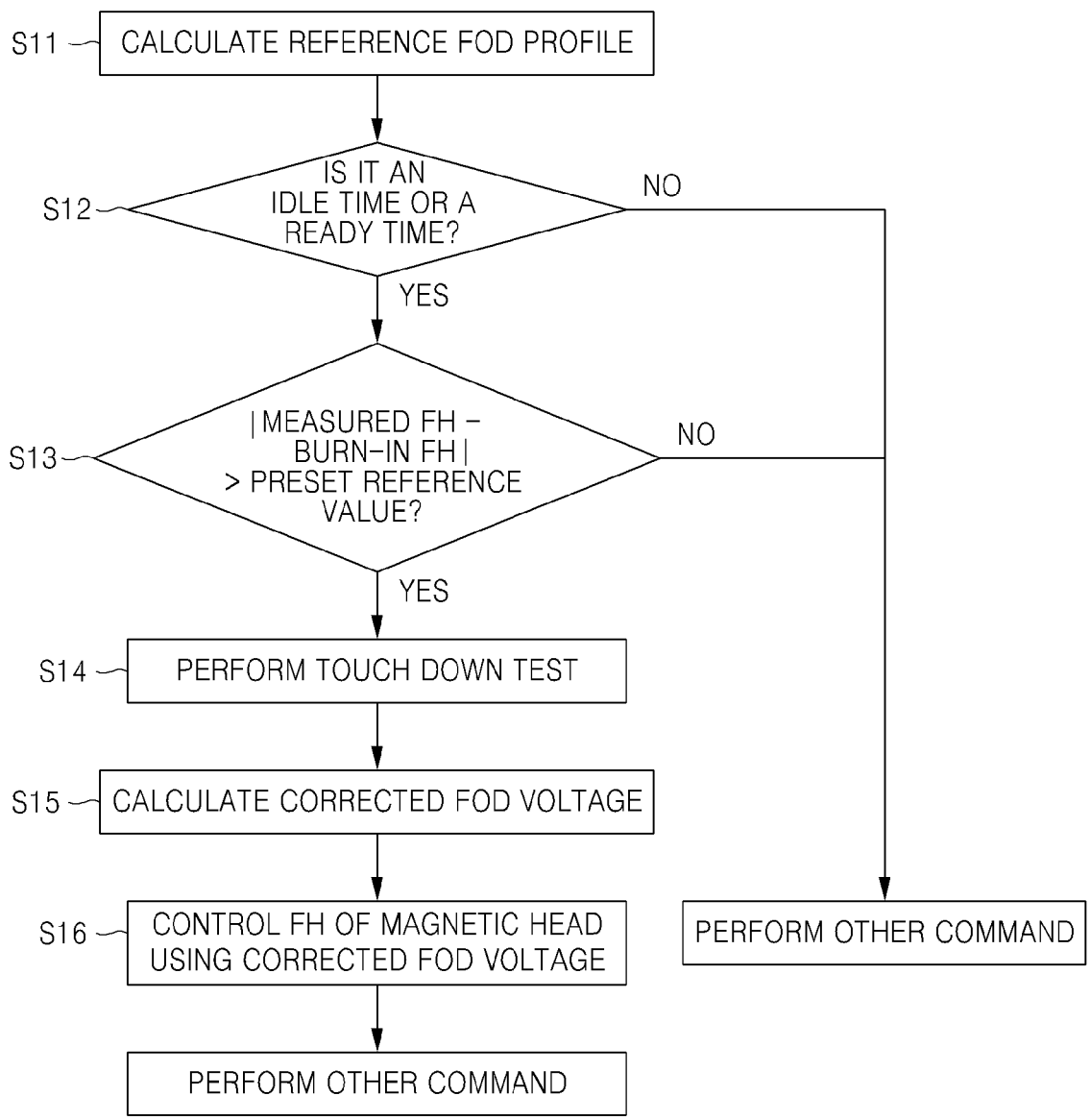
FIG. 3 is a flowchart illustrating a method of controlling a flying height of a magnetic head of a hard disk drive apparatus according to an embodiment of the present general inventive concept.

The method of controlling the FH of the magnetic head 41 of the HDD 1 according to an embodiment of the present general inventive concept will now be described below with reference to FIGS. 3 and 4. The process of manufacturing the HDD 1 may include one or more combinations of six processes of a mechanical assembly process, a servo write process, a function test process, a burn-in process, a final test process, a releasing test process, and a packaging and releasing process.

First, by performing a touch down test in the burn-in process of the manufacturing process of the HDD 1, the reference FOD voltage profile 71 defining the relationship between the FOD voltage applied to the magnetic head 41 and the FH of the magnetic head 41 that varies according to the FOD voltage is provided at operation S11. The data about the reference FOD voltage profile 71, that is, the data including the FOD voltage (burn-in FOD voltage FOD_X) to be applied during the read and write operation in the user environment, is stored in a maintenance cylinder 11a of the disk 11. The maintenance cylinder may refer to the outermost area of the disk 11 where various system information and information about maintenance and repair of the HDD 1 are stored.

Whether it is an idle time or a ready time in the user environment is determined at operation S12. When it is the idle time or ready time, it is determined whether an absolute value of the difference ΔFH between the measured FH FH2 of the magnetic head 41 measured by applying the burn-in FOD voltage FOD_X to the heater 42 disposed on or in the magnetic head 41 and the burn-in FH FH1 of the magnetic head 41 corresponding to the burn-in FOD voltage FOD_X of the reference FOD voltage profile 71 exceeds a preset reference value at operation S13.

The preset reference value can be determined by a statistic data value of the magnetic heads 41 deviating from a predetermined reference in a constant table Table or Equation to compensate for a conventional FOD. When the absolute value of the difference ΔFH between the measured FH FH2 and the burn-in FH FH1 of the magnetic head 41 exceeds the preset reference value, the FOD voltage is calculated by actual measurement, which will be described later.

For the convenience of explanation, referring to FIG. 4, when the FOD voltage FOD_X of an amount "X", that is, the burn-in FOD voltage FOD_X, is applied to the heater on or in the magnetic head 41, the burn-in FH FH1 of the reference FOD voltage profile 71 is 7 nm, and the measured FH FH2 is 4 nm, the absolute value ΔFH according to the difference value is 3 nm. When the preset reference value is 2 nm, since the absolute value ΔFH according to the difference value exceeds the reference value, a corrected FOD voltage is calculated by correcting the burn-in FOD voltage FOD_X to obtain the target FH of the magnetic head 41 through an actual measurement. However, when the preset reference value is 4 nm, the absolute value ΔFH according to the above difference value does not exceed the reference value, the actual measurement is not performed so that other commands are performed as shown in FIG. 3.

When the absolute value ΔFH according to the measured FH FH2 and the burn-in FH Fh1 exceeds the preset reference, a touch down test is performed to obtain the corrected FOD voltage by correcting the burn-in FOD voltage FOD_X (S14). The corrected FOD voltage corresponding to the target FH of the magnetic head 41 in the user environment is calculated through the data obtained from the touch down test (S15).

The touch down test is a test to allow an end tip of the magnetic head 41 to touch the disk 11 by applying a gradually increasing FOD voltage to the heater 42 of the magnetic head 41, thereby obtaining the maximum FH of the magnetic head 41 and the maximum FOD voltage when the magnetic head 41 touches down on the disk 11. The idle time is a time during which the host 97 sends a command to the HDD 1, which does not affect the performance at all even though the touch down test is performed. Then, a corrected FOD voltage can be applied to the heater 42 during a read and write operation in the user environment to appropriately control the FH of the magnetic head 41 at operation S16.

Here, the corrected voltage may be generated according to a corrected profile 71a or 71b as illustrated in FIG. 4.

Although FIG. 4 illustrates the corrected profile 71a or 71b not passing through a point A, the corrected profile 71a or 71b can pass through the point A according to the touch down test.

It is possible that the reference flying height of the FOD voltage profile 71 and the measured flying height of the magnetic head 41 through the touch down test can be used to calculate the flying height FH2 when the FOG voltage is applied to the heater 42 according to the FOD voltage profile 71, or can be used to obtain the corrected profile 71a or 71b.

In the present embodiment, the touch down test is performed only when the difference between the measured FH FH2 and the burn-in FH FH1 exceeds the preset reference value in the actual user environment. Thus, since the touch down test is performed only when the absolute value ΔFH exceeds the reference value, it is an advantage that the number of the touch down tests is reduced and limited. Also, the corrected FOD voltage that can accurately maintain the target FH of the magnetic head 41 in an actual environment can be calculated through the touch down test. Furthermore, by controlling the FH of the magnetic head 41 by applying the corrected FOD voltage, the target FH of the magnetic head 41 in the actual environment can be maintained.

That is, the touch down test and the preset reference value can be set to correspond to a plurality of environmental factors of the HDD 1, e.g., temperature, humidity, magnetic field, wear and tear state, etc. Depending on the environments where the HDD 1 is used, a level of the preset reference can be determined and a touch down test method can be determined.

As described above, according to the present embodiment, the corrected FOD voltage maintaining the target FH of the magnetic head 41 in the actual environment is calculated through the actual touch down test in an environment different from the environment of the burn-in process and the FH of the magnetic head 41 is controlled using the corrected FOD voltage, so that the weak write or head disk interference (HDI) problem can be solved.

Although in the above-described embodiment the touch down test is performed when the absolute value according to the difference between the measured FH and the burn-in FH exceeds the preset reference value, in some cases, the touch down test can be performed when a value obtained by subtracting the burn-in FH from the measured FH is deviated from a preset range including a negative (−) number.

As described above, according to the present invention, an FOD voltage that can substantially maintain the target FH of the magnetic head can be applied in a variety of environments. Thus, the weak write or HDI problem can be solved.

Although a few embodiments of the present general inventive concept have been shown and described, the present invention is not limited to the described embodiments. Instead, it would be appreciated by those skilled in the art that changes may be made to these embodiments without departing from the principles and spirit of the general inventive concept, the scope of which is defined by the claims and their equivalents.

What is claimed is:

1. A method of controlling a flying height of a magnetic head of a hard disk drive apparatus, the method comprising:
   determining whether a difference between a measured flying height of the magnetic head measured by applying a burn-in FOD (flying on demand) voltage corresponding to a target flying height of a reference FOD voltage profile defining a relationship between the flying height of the magnetic head and the FOD voltage by which an end of the magnetic head thermally expands and thus protrudes, to a heater included in the magnetic head, and a burn-in flying height of the reference FOD voltage profile corresponding to the burn-in FOD voltage exceeds a preset reference;
   calculating a corrected FOD voltage for the target flying height by performing a touch down test of the magnetic head with respect to a disk, when the difference between the measured flying height of the magnetic head and the burn-in flying height exceeds the preset reference; and
   controlling a flying height of the magnetic head by applying the corrected FOD voltage.

2. The method of claim 1, wherein the determining of whether a difference between the measured flying height of the magnetic head and the burn-in flying height of the magnetic head exceeds the preset reference comprises:
   determining whether it is an idle time or a ready time;
   measuring the measured flying height of the magnetic head by applying the burn-in FOD voltage;
   calculating an absolute value of the difference between the measured flying height of the magnetic head and the burn-in flying height of the magnetic head; and
   determining whether the absolute value of the difference between the measured flying height of the magnetic head and the burn-in flying height of the magnetic head exceeds the preset reference value.

3. The method of claim 1, wherein the determining of whether a difference between the measured flying height of the magnetic head and the burn-in flying height of the magnetic head exceeds the preset reference and the calculating of a corrected FOD voltage for the target flying height are performed during the idle time or ready time of the hard disk drive.

4. The method of claim 1, wherein the reference FOD Voltage profile is provided in a burn-in process.

5. A non-transitory recording medium to contain computer-readable codes as a computer program to execute a method of controlling a flying height of a magnetic head of a hard disk drive apparatus, the method comprising:
   determining whether a difference between a measured flying height of the magnetic head measured by applying a burn-in FOD (flying on demand) voltage corresponding to a target flying height, according to a reference FOD voltage profile defining a relationship between the flying height of the magnetic head and the FOD voltage by which an end of the magnetic head thermally expands and thus protrudes, to a heater included in the magnetic head, and a burn-in flying height of the reference FOD voltage profile corresponding to the burn-in FOD voltage exceeds a preset reference;
   calculating a corrected FOD voltage for the target flying height by performing a touch down test of the magnetic head with respect to a disk, when the difference between the measured flying height of the magnetic head and the burn-in flying height exceeds the preset reference; and
   controlling a flying height of the magnetic head by applying the corrected FOD voltage.

6. A hard disk drive apparatus comprising:
   a magnetic head to record data on a disk or to reproduce the recorded data from the disk; and
   a controller to determine whether a difference between a measured flying height of the magnetic head measured by applying a burn-in FOD (flying on demand) voltage corresponding to a target flying height, according to a reference FOD voltage profile defining a relationship between the flying height of the magnetic head and the FOD voltage by which an end of the magnetic head thermally expands and thus protrudes, to a heater included in the magnetic head, and a burn-in flying height of the reference FOD voltage profile corresponding to the burn-in FOD voltage exceeds a preset reference, and to control the flying height of the magnetic head by applying a corrected FOD voltage for the target flying height that is calculated by performing a touch down test of the magnetic head with respect to the disk when the difference between the measured flying height of the magnetic head and the burn-in flying height of the magnetic head exceeds the preset reference.

7. The hard disk drive apparatus of claim 6, wherein, when the controller determines whether the difference between the measured flying height of the magnetic head and the burn-in flying height of the magnetic head exceeds the preset reference, in an idle time or ready time, the controller determines whether an absolute value of the difference between the measured flying height of the magnetic head measured by applying the burn-in FOD voltage and the burn-in flying height of the magnetic head exceeds the preset reference.

8. The hard disk drive apparatus of claim 6, wherein the controller calculates a corrected FOD voltage for the target flying height in the idle time or ready time of the hard disk drive.

9. The hard disk drive apparatus of claim 6, wherein the reference FOD voltage profile is provided in a burn-in process.

10. A hard disk drive apparatus comprising:
a magnetic head unit having a head and a heater; and
a controller to apply an FOD voltage of a FOD voltage profile to the heater, and to adjust the FOD voltage according to a measured flying height of the head with respect to the applied FOD voltage, a reference flying height of the FOD voltage profile, and a maximum flying height of a touch down test.

11. The hard disk drive apparatus of claim 10, wherein the controller performs the touch down test to measure the maximum flying height when a difference between the measured flying height and the reference flying height is greater than a reference.

12. The hard disk drive apparatus of claim 10, wherein the FOD voltage is a burn-in FOD voltage.

13. The hard disk drive apparatus of claim 10, wherein the FOD voltage profile comprises a plurality of sub VOD voltage profiles having FOD voltages and reference flying voltages according to a plurality of environments.

14. The hard disk drive apparatus of claim 10, wherein the controller obtains a corrected FOD voltage with respect to the reference flying height according to the adjusted FOD voltage.

15. The hard disk drive apparatus of claim 10, wherein the reference comprises a plurality of sub references according to a plurality of environmental factors, and one of the plurality of the sub references is selected as the reference according to one of the plurality of environmental factors.

16. The hard disk drive apparatus of claim 10, wherein the controller applies the adjusted FOD voltage to the magnetic head unit to maintain the reference flying height.

17. A method of controlling a flying height of a magnetic head of a hard disk drive apparatus, the method comprising:
a magnetic head unit having a head and a heater; and
applying an FOD voltage of a FOD voltage profile to a heater of the magnetic head unit, and adjusting the FOD voltage according to a measured flying height of the head with respect to the applied FOD voltage, a reference flying height of the FOD voltage profile, and a maximum flying height of a touch down test.

18. The method of claim 17, further comprising:
performing the touch down test to measure the maximum flying height when a difference between the measured flying height and the reference flying height is greater than a reference.

19. The method of claim 17, wherein the FOD voltage is a burn-in FOD voltage.

20. The method of claim 17, wherein the FOD voltage profile comprises a plurality of sub VOD voltage profiles having FOD voltages and reference flying voltages according to a plurality of environments.

21. The method of claim 17, further comprising:
obtaining a corrected FOD voltage with respect to the reference flying height according to the adjusted FOD voltage.

22. The method of claim 17, wherein the reference comprises a plurality of sub references according to a plurality of environmental factors, and one of the plurality of the sub references is selected as the reference according to one of the plurality of environmental factors.

23. The method of claim 17, wherein the adjusted FOD voltage is applied to the magnetic head unit to maintain the reference flying height.

* * * * *